United States Patent [19]

Hahn et al.

[11] Patent Number: 4,703,176
[45] Date of Patent: Oct. 27, 1987

[54] COMPACT POLYPHASE OPTICAL POSITION ENCODER

[75] Inventors: Peter S. Hahn, Fremont; Thomas R. Stone, Pleasanton; William G. Moon, Sunnyvale; Joel N. Harrison, Monte Sereno, all of Calif.

[73] Assignee: Plus Development Corporation, Milpitas, Calif.

[21] Appl. No.: 741,179

[22] Filed: Jun. 4, 1985

[51] Int. Cl.$^4$ .............................................. G01D 5/34
[52] U.S. Cl. .......................... 250/231 SE; 250/237 G
[58] Field of Search ..................... 250/231 SE, 237 G; 340/347 P; 356/395; 324/175

[56] References Cited

U.S. PATENT DOCUMENTS

| 3,058,001 | 10/1962 | Dertouzos | 250/231 SE |
| 3,400,275 | 9/1968 | Trump . | |
| 4,184,071 | 1/1980 | Fryer et al. . | |
| 4,224,514 | 9/1980 | Weber | 250/231 SE |
| 4,326,128 | 4/1982 | Klein | 250/237 G |
| 4,375,592 | 3/1983 | Cox et al. | 250/231 SE |
| 4,396,959 | 8/1983 | Harrison et al. . | |
| 4,593,269 | 6/1986 | Nakamura et al. | 250/231 SE |
| 4,625,109 | 11/1986 | Nixon | 250/231 SE |

Primary Examiner—Edward P. Westin
Attorney, Agent, or Firm—David B. Harrison

[57] ABSTRACT

A compact polyphase optical encoder subassembly for installation in host equipment is disclosed. The subassembly includes a moveable scale; and, a unitized rotatable housing for aligning a light source, a mask and a photodetector array having at least a pair of photodetector areas symmetrically disposed about an axis of rotation of the housing and responsive to light energy from the light source in further response to relative position of the scale. The housing further includes in its preferred form a bolt having a widened head and a threaded shank for passing through an opening in a base of the host, a threaded nut engageable with the shank opposite to the head for thereby securing the bolt to the base, and a compressible washer for enabling a predetermined range of vertical compression between the head and the base as the nut is tightened on said shaft. The housing further includes a light source holder which in preferred form comprises a central support, a reflective surface in optical alignment with the photodetector array and being aligned and supported by the central support, and a lateral arm spaced away from the central support, the lateral arm for holding the light source in optical alignment with the reflective surface, whereby the subassembly may be made very compact in terms of height and still provide a substantial distance between the light source and the mask, thereby minimizing penumbra effects.

5 Claims, 12 Drawing Figures

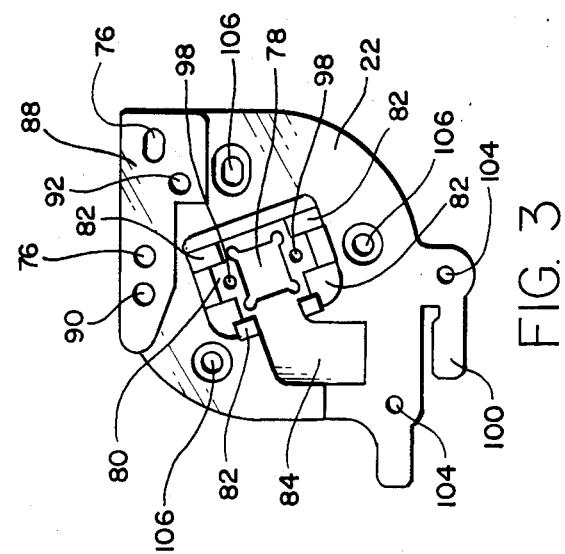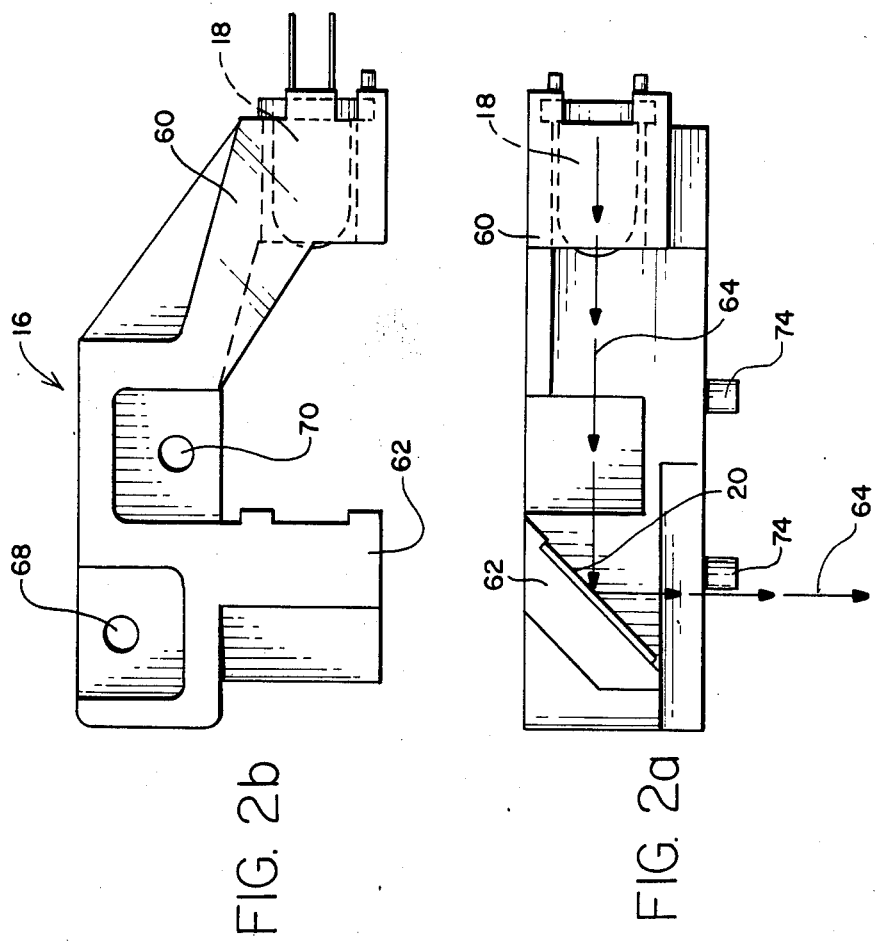

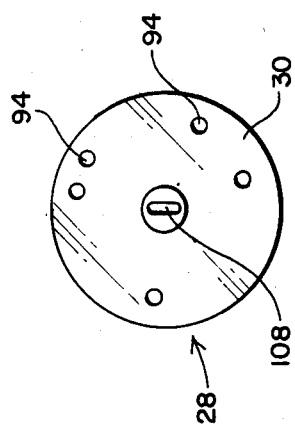
FIG. 4b
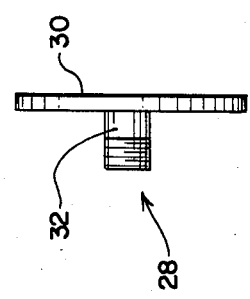
FIG. 4a
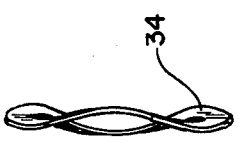
FIG. 5
FIG. 6
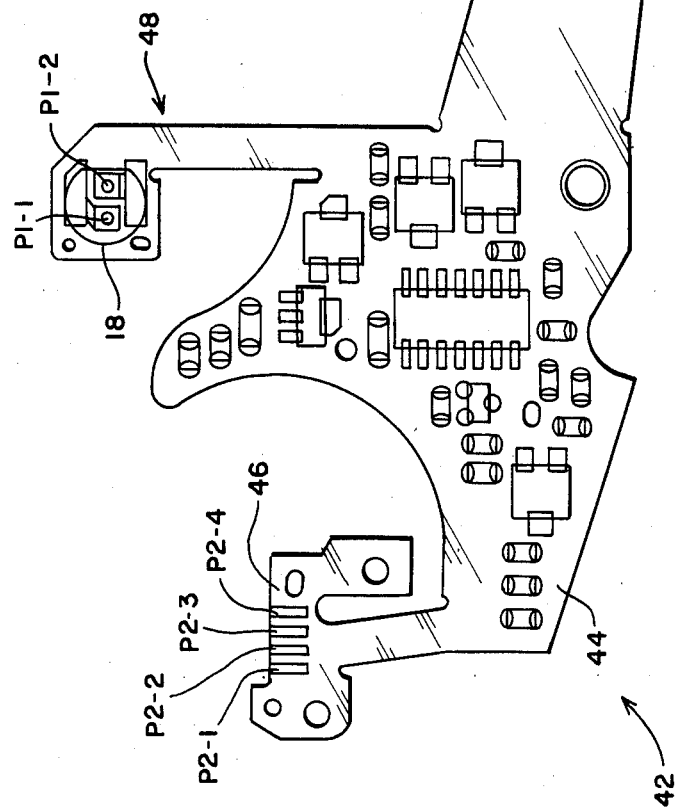
FIG. 9

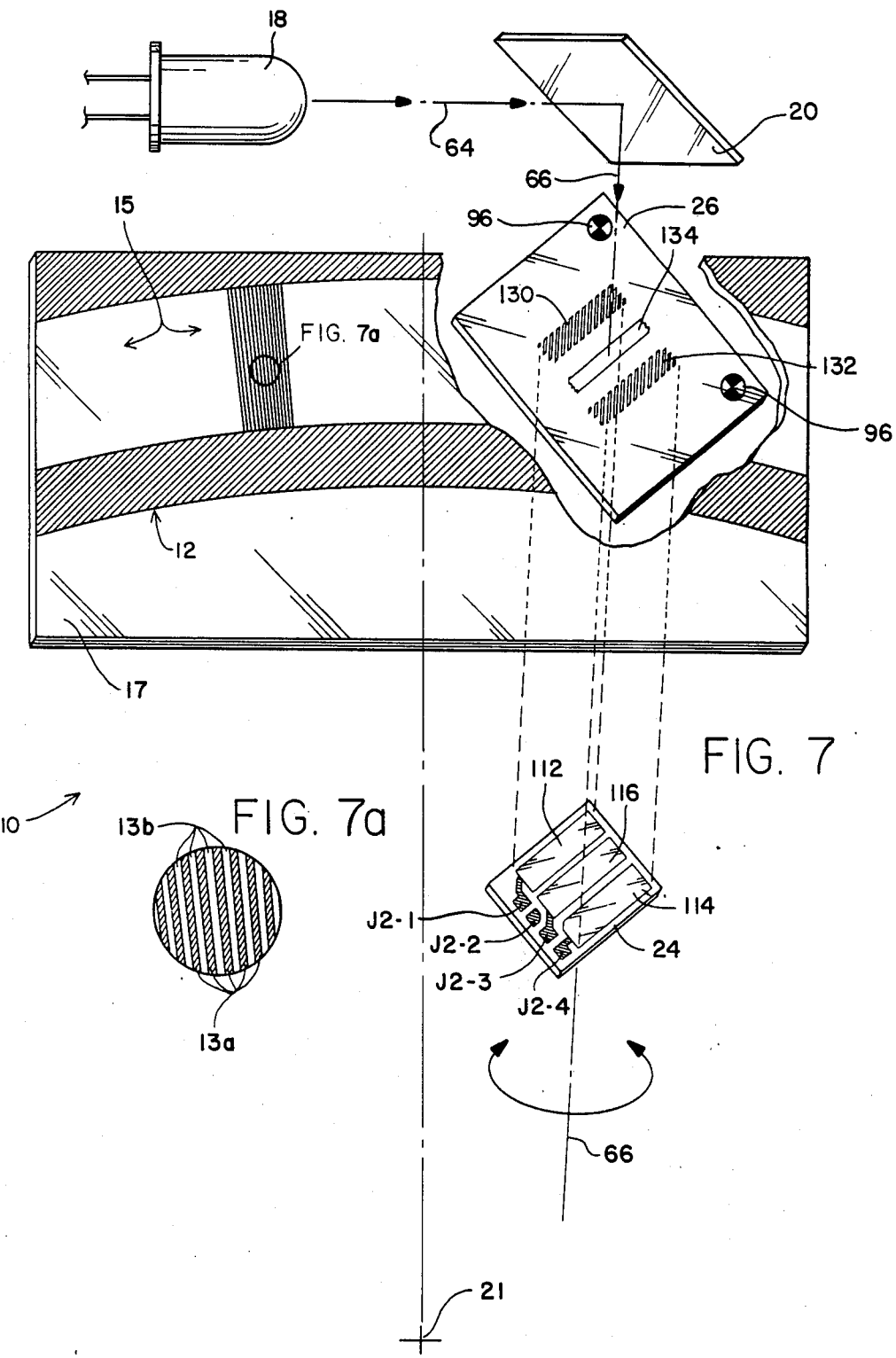

COMPACT POLYPHASE OPTICAL POSITION ENCODER

FIELD OF THE INVENTION

The present invention relates to incremental position encoders employing electro-optics. More particularly, the present invention relates to an improved optical encoder assembly.

REFERENCE TO RELATED PATENTS AND PATENT APPLICATIONS

The following patents and patent applications are pertinent to the present invention:
U.S. Pat. No. 3,400,275 to Trump.
U.S. Pat. No. 4,184,071 to Fryer et al.
U.S. Pat. No. 4,396,959 to Harrison et al., now U.S. Pat. No. Re. 32,075.
U.S. Pat. No. 4,490,635 to Harrison et al.
U.S. patent application Ser. No. 555,591 filed on Nov. 28, 1983, now U.S. Pat. No. 4,625,109 to Nixon.
U.S. patent application Ser. No. 609,224 filed on May 11, 1984, now U.S. Pat. No. 4,647,769.
U.S. patent application Ser. No. 741,174 filed on June 4, 1985, now U.S. Pat. No. 4,661,696, the disclosure of which is hereby incorporated herein by reference thereto.
U.S. patent application Ser. No. 741,175, filed on June 4, 1985, now U.S. Pat. No. 4,639,863.

BACKGROUND OF THE INVENTION

Incremental position encoders employing electrooptics are known in the prior art. One specific example of an optical encoder providing for phase adjustment via adjustment of focus of light beams from a light source is described in the Trump U.S. Pat. No. 3,400,275. Another specific example of a modular shaft encoder including on-board electronic circuitry and providing phase shifted outputs in quadrature is the referenced Freyer et al. U.S. Pat. No. 4,184,071. One of the advantages claimed for that approach was that of modularity which enabled the encoder assembly to be pre-calibrated prior to its installation on a motor shaft. Difficulties otherwise associated with installation and trim were said to be minimized.

A further specific example is found in the referenced Harrison et al. U.S. Pat. No. 4,396,969, particularly as found in the discussion of FIGS. 5-7 thereof. In the Harrison et al. patent, the optical encoder was provided as a key element of a servo system for a rotating, non-removable disk data storage device. The drive included a novel rotary actuator, U.S. Pat. No. 4,490,635, which had a rotary displacement of only about 30°. The encoder thereof included a scale edge mounted to the rotary actuator and an encoder housing mounted to the base casting of the drive. The photodetector array put out analog phase signals in quadrature which were selected to control an analog servo loop having an offset value derived from a data storage surface in track following mode. The quadrature signals additionally provided indications of track boundary crossings and were used by a programmed microprocessor to determine transducer relative position during track seeking operation. The other referenced applications comprise further improvements in the encoder described in the referenced Harrison et al. patent.

One of the drawbacks of the prior optical encoder described in the Harrison et al. patents and e.g. the Nixon U.S. Pat. No. 4,625,109 was that it was not a compact modular assembly which could be assembled, electrically tested and calibrated with its associated electronics as a unit prior to its installation into the disk drive.

Another drawback of the referenced prior optical encoder was that the optical path between the infrared LED light source and the photodetector was so short that light beam collimation was minimal leading to an undesirable penumbra effect. Poorly collimated light from the light source causes the amplitude of the encoder signal to degrade very rapidly as a function of scale to reticle gap; i.e., it forces the encoder to be operated at a smaller gap and makes it inordinately sensitive to changes in gap length.

A further drawback of the referenced prior optical encoder was that its manner of mounting did not facilitate ready alignment and smooth trim during the assembly and calibration process.

SUMMARY OF THE INVENTION WITH OBJECTS

A general object of the present invention is to provide a self-contained incremental position encoder assembly for use with a limited displacement member such as a rotary transducer actuator assembly in a rotating disk data storage device.

A more specific object of the present invention is to provide a polyphase incremental position encoder assembly which may be assembled with its associated electronic circuitry and tested prior to integration into the host system which requires incremental position information.

Yet another object of the present invention is to provide a height-compacted optical encoder electro-optical subassembly which extends substantially the distance between the light source and the photodetector array so as to minimize unwanted penumbra effects, and consequent sensitivity of the encoder to the gap between the scale and mask.

Still a further object of the present invention is to provide a flexible circuit substrate for a compact optical encoder assembly in a manner which facilitates assembly testing and alignment prior to integration into the host system.

One more object of the present invention is to provide a unique electrical reference voltage circuit for a compact optical encoder assembly.

Yet another object of the present invention is to provide a very compact optical encoder assembly which is inexpensive to manufacture and test, yet reliable over an extended service life, thereby decreasing cost and increasing reliability of the host system into which the assembly is integrated.

In a principal aspect of the present invention, a compact polyphase optical encoder assembly is provided for installation in host equipment. The assembly cooperates with a limited displacement, movable scale with alternating equally dimensioned opaque and translucent regions extending generally perpendicular to the locus of scale movement. It further includes a unitized subassembly including a rotatable housing for aligning and supporting a light source, a mask and a photodetector array having at least a pair of photodetector areas symmetrically disposed about an axis of rotation of the housing and responsive to light energy from the light source in further response to relative position of the scale.

The housing includes a bolt having a widened head and a threaded shank for passing through an opening in a base of the host equipment; a threaded nut engageable with the threaded shank opposite to the widened head for thereby securing the bolt to the base; and, a compressible spring washer for enabling a predetermined range of vertical compression between the widened head and the base as the nut is tightened on the shaft.

The housing further includes a cell holder mounted to the widened head for holding the photodetector array and the mask in a predetermined proper alignment. Also, the housing further includes a light source holder mounted to the cell holder for holding the light source at a predetermined distance away from the cell holder, the cell holder and the light source holder defining a transverse opening enabling the scale to pass freely adjacent to the mask. Thus, rotation of the housing facilitates lead-lag phase trim of the encoder assembly and compression of the washer controls gap spacing between the scale and the mask.

In another aspect of the present invention, the light source holder comprises a central support which aligns and supports a reflective surface in optical alignment with the photodetector array, and a lateral arm spaced away from the central support for holding the light source in optical alignment with the reflective surface, whereby the electro-optical subassembly may be made very compact in terms of height and still provide a substantial distance between the light source and the mask, thereby minimizing unwanted penumbra effects.

In another aspect of the present invention, the compact assembly further includes an electronic circuit mounted to an electronic circuit substrate, said circuit substrate including a first flexible connection region for facilitating direct electrical connection to the photodetector array, a second flexible connection region for facilitating direct electrical connection to the light source, and a third flexible connection region for facilitating direct electrical connection to the host equipment.

In one more aspect of the present invention, the electronic circuit substrate of the compact assembly further includes plural operational amplifiers, configured as current to voltage converters, each being connected to a photosensitive area of the photodetector array and adjustable gain setting means for adjustment of the output level from each said photosensitive area. Additionally, the electronic circuit substrate includes circuitry for varying the reference voltage applicable to the substrate of the photodetector array and the amplifiers, and for varying light source driving current so as to accomodate a range of spacing between the scale and the mask and still provide polyphase signals of predetermined peak to peak amplitude.

These and other objects, advantages and features of the present invention will be further understood and appreciated by considering the following detailed description of a preferred embodiment, presented in conjunction with the accompanying drawings.

BRIEF DESCRIPTION OF THE DRAWINGS

In the Drawings:

FIGS. 2A and 2B are respectively side elevation and top plan views of a light source holder element of the assembly of FIG. 1.

FIG. 3 is a top plan view of a photocell and mask holder element of the assembly of FIG. 1.

FIGS. 4A and 4B are respectively side elevation and bottom plan views of a support bolt element of the assembly of FIG. 1.

FIG. 5 is a view in side elevation of a wave spring washer element of the assembly of FIG. 1.

FIG. 6 is a top plan view of a nut element of the assembly of FIG. 1.

FIG. 7 is an enlarged diagrammatic view illustrating optical path arrangement and position of the light source, mirror, scale, mask and photocell array elements of the assembly of FIG. 1.

FIG. 7A is an enlarged diagrammatic portion of the spaced-apart opaque radial microline regions of the scale depicted in FIG. 7.

FIG. 9 is a top plan view of a flexible printed circuit substrate illustrating component layout of the circuit depicted electrically in FIG. 8.

DETAILED DESCRIPTION OF A PREFERRED EMBODIMENT

Figure 1:
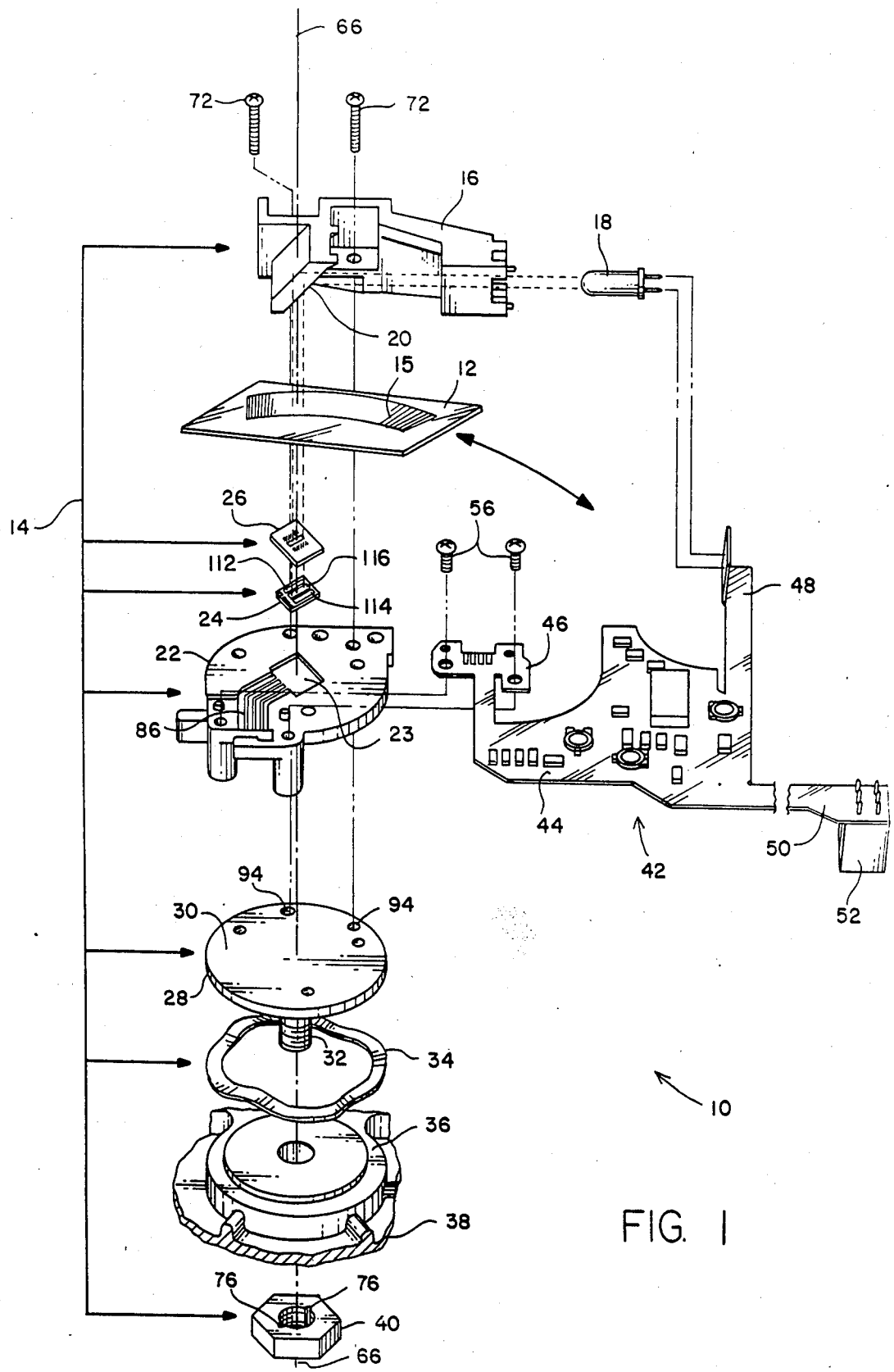
FIG. 1 is an exploded diagrammatic view in perspective of the structural elements comprising a compact optical encoder assembly which incorporates the principles of the present invention.

FIG. 1 depicts diagrammatically in exploded view the elements which make up a compact optical encoder assembly 10 which follows the teachings of the present invention. The encoder assembly includes three major parts.

The first part of the encoder assembly 10 is a moving scale 12 which may be of continuous or limited displacement and may be secured to any moving structure relative to a fixed base. The scale 12 includes a radical microline area 15 defining a multiplicity of spaced apart translucent radial regions 13b which are separated by light opaque regions 13a, as more clearly shown in FIG. 7A.

The second part of the encoder assembly 10 is a unitized encoder electro-optical subassembly structure 14, the elements of which are pointed to by the multiple headed, common lead line 14 in FIG. 1. These structural elements comprise a light source holder 16 carrying an LED light source 18 and a mirror 20, a photocell array carrier 22 carrying and aligning a photocell array 24 and an overlying mask or reticle 26, a support bolt 28 having a widened circular head 30 forming a support table for mounting the light source holder 16 and the photocell array carrier 22 and having a threaded cylindrical shank 32. A wave spring washer 34 is interposed between the shank 32 and an annular machined plateau 36 surrounding a cylindrical opening of a base 38 of host equipment which provides a fixed base for the encoder subassembly 10. The cylindrical opening is sized to receive the shank therethrough in a freely rotating relationship. A locking nut 40 threads onto the shank 32 after it is passed through the base 38 so as to secure the bolt 28 and the other elements it carries to the base 38.

The third part of the encoder assembly 10 is an electronic circuit 42 which is preferably formed of electronic components secured to flexible film printed circuit substrate 44. The substrate 44 includes three integral flexible connection extensions, a first extension 46 enabling direct electrical connection to the photodector array 24, a second extension 48 enabling direct electrical connection to the LED light source 18, and a third extension 50 which includes a suitable plug 52 enables direct overall electrical connection of the subassembly 10 to the host equipment. Thus, the encoder assembly 10 may be constructed by fabrication of the electro-optical subassembly 14, fabrication of the electronic circuit 42 on the substrate 44 and direct connection of the substrate to the photocell array 24 and to the LED 18, as shown diagrammatically in FIG. 1. In this manner the encoder 10 may be tested and aligned as an assembly (with a reference scale and gap) prior to its installation into the host equipment, such as a disk drive. By constructing, testing and calibrating the assembly 10 (and rejecting unacceptable assemblies 10, if any) prior to installation into the host equipment, host equipment yields are thereby increased.

Each of these three essential parts of the compact encoder assembly 10 will now be described in greater detail.

SCALE 12

The scale 12 may be linear or rotary, depending upon the application. In the preferred embodiment, the scale 12 is secured to and part of a limited displacement rotary actuator assembly in a very thin (approximately one inch overall height) and compact rotating non-removable disk data storage device which advantageously uses incremental polyphase position information provided by the compact encoder subassembly 10 in order to assist in establishing and maintaining proper track position of a data transducer relative to concentric data storage tracks on a storage surface of a rotating storage disk. Such a compact disk data storage device is shown for example in the previously referenced U.S. Pat. No. 4,639,863. An enlarged view of the scale is set forth in FIG. 7.

In the preferred embodiment, the scale 12 is formed on a transparent glass substrate 17 by photo reduction from an enlarged master to the substrate. During the manufacturing process, the substrate 17 is coated with a suitably opaque material such as chromium. An emulsion is then placed on the chromium coating and is developed following light exposure. Finally, an etching process leaves chromium opaque regions 13a interspersed with equally dimensioned and spaced apart translucent openings 13b from which the chromium has been removed by the etching process, as shown in the greatly enlarged portion depicted in FIG. 7A.

In the preferred embodiment, the glass substrate 17 is a rectangle having a width of approximately 15 millimeters and a length of approximately 31.2 millimeters. The radial microline translucent openings 13b are on a pitch of 0.1315 degrees and each opening is one half that width. The radius of rotation to the outer circumference of the scale 12 is 66.2 millimeters and the inside radius is 60.64, resulting in translucent microlines of 5.56 millimeters in radial length. Thus, the approximate dimension of each translucent opening 13b (and adjacent opaque region 13a) is 5.56 mm in length and 0.0658 degrees in width.

UNITIZED ENCODER STRUCTURE 14

The elements comprising the utilized encoder structure 14 have already been briefly identified above. Each will now be discussed in further detail.

One of the drawbacks of prior art encoders such as those described in the referenced patents and applications was that the closeness of the light source to the scale and reticle (mask) created a penumbra effect which required close spacing between the scale and the mask and which resulted in excessive sensitivity to changes in the scale to mask gap. This was because the light beam was not perfectly collimated even with the aid of a collimating lens. In an ideal optical encoder, there is no space between the scale and the mask, and there is no possibility that non-parallel light can leak or scatter around the alternating opaque and translucent edges.

Unfortunately, even though the chromium microlines of the scale 12 are formed on the bottom surface of the glass substrate 17 and corresponding openings (described hereinafter) are formed on the upper surface of the mask 26, some small gap or clearance must always be present between the moving scale 12 and the fixed mask 26. This gap leads directly to penumbra effects.

The inventors have solved the problem posed by the penumbra effect, in part, by moving the light source as far away as possible from the scale 12 and mask 26, thereby more closely approximating a collimated light beam.

In order to maintain a highly compact overall height dimension for the encoder structure 14, the light source holder 16 has been formed of a suitable molded plastic material in a manner which holds the LED light source 18 horizontally away from the structure by providing an LED support arm 60, as shown in FIGS. 2A and 2B. The support arm portion 60 rigidly houses a high intensity LED infrared light source, such as a TRW OP2-96A, and directs its high intensity infrared light energy output toward the mirror 20 which is supported by a mirror support 62 aligned with the axis of rotation of the encoder. In this manner, the optical axis for the light energy from the LED 18, depicted by the locus of arrows generally indicated by the reference numeral 64 in FIG. 2A, is redirected downwardly along an axis of rotation, generally indicated by the reference numeral 66 in FIG. 1, of the encoder structure 14.

The light source holder main body 16 also provides suitable structure defining two holes 68, 70 through which screws 72 pass for securing the holder 16 to the table 30 of the bolt 28. Two downwardly depending alignment pins 74 are also integrally formed with the main body 16. These pins 74 enter alignment holes 76 defined by the photodetector array carrier 22, illustrated in FIG. 3.

Referring now to FIG. 3, the photodetector array carrier 22 is formed of a suitable molded plastic material, and it functions to receive and align the photodetector array 24 in a first well region 78, and to receive and align the reticle or mask 26 in a second, more shallow region 80 which includes four corner support posts 82.

A third well 84 receives a very small printed circuit board 86 which facilitates electrical connection between the array 24 and the first electronic substrate connection region 46.

A raised flat plateau 88 abuts an adjacent opposed lower surface of the light source holder 16. The screws 72 pass through openings 90 and 92 which are aligned respectively with the openings 68 and 70 of the light source holder. Thus, once the screws are screwed into threaded openings 94 through the table 30 of the bolt 28, the light source holder 16 is thereby secured to the bolt 28.

In the assembly process, the photodetector array 24 and the printed circuit board 86 are secured in their respective wells 78 and 84 with a suitable adhesive material. Then, very fine wires are bonded between connection pads J2-1, J2-2, J2-3 and J2-4 of the array 24 and corresponding electrical circuit traces formed on the board 86.

Next, the mask 26 is secured by adhesive to the four corner posts 82. Two alignment patterns 96 formed on the mask 26 are used to enable precise optical alignment of the mask 26 relative to the photocarrier array carrier 22. Two holes 98 in the carrier 22 enable back lighting of the alignment patterns 96 which may then be brought into correspondence with references of an alignment jig.

A finger 100 is formed on the array carrier 22. This finger defines a slot through which the first connection portion 46 of the flexible circuit substrate 44 is upwardly threaded. Screws 102 are then threaded through openings of the portion 46 and into corresponding openings 104 defined by the carrier 22, so that the connection portion 46 is aligned adjacent to the small printed circuit board 86. Then, aligned connection traces of the portion 46 are soldered to corresponding traces of the small printed circuit board 86, thereby effectuating appropriate electrical connections of the photodetector array 24 to the electronic circuit 42.

Three countersunk openings 106 enable screws to be threaded into threaded openings of the table 30, thereby securing the carrier 22 to the bolt 28. It will be evident to those skilled in the art that the photodetector array carrier 22 is first secured to the table 30, and then the light source carrier 16 is secured to the table 30.

Turning to FIGS. 4A and 4B, the structure of the bolt 28 may be further appreciated. The table portion 30 essentially provides a disk-shaped support surface for the photodetector array carrier 22 and for the light source carrier 16, as already explained. The shank 32 of the bolt 28 is threaded with fine threads, e.g. 0.5 millimeter pitch. This fine pitch enables more precise vertical alignment of the utilized encoder structure 14 relative to the base 38. A slot 108 is formed in the bottom of the shank 32, and this slot 108 enables the bolt 28 to be precisely oriented angularly about the axis of rotation 66 to effectuate bilateral phase trim of the optical encoder subassembly 10.

FIG. 5 illustrates the undulating or wave spring washer 34 which provides compression over a predetermined range of vertical displacement, e.g. approximately 0.5 to 1.1 millimeters. The wave spring washer 34 bears against the underside of the table 30 and oppositely against the raised plateau surface 36 of the base 38. The amount of compression of the wave spring washer 34 determines the relative placement of the encoder structure 14 relative to the base 38 and consequently the scale 12. Thus, compression of the wave spring washer 34 may be used to fix the gap between the scale 12 and the mask 26 during the installation of the encoder subassembly 10 into the host equipment.

FIG. 6 depicts the threaded nut 40. This nut 40 has threads of the same pitch as the threaded shank 32 of the bolt 28. Two opposed longitudinal cavities 110 are provided in the threaded opening of the nut 40. These cavities 110 enable a glue to be injected to seal the nut 40 in position after the encoder structure 14 has been properly installed and aligned in the host equipment, both vertically and radially respectively via the tightening of the nut 40 and by the rotation of the shank 32 with an alignment tool placed in the slot 108.

The details of the geometric relationship between the scale 12, mask 26 and photodetector array 24, illustrated graphically in FIG. 7, are described in detail in the referenced and incorporated U.S. patent application Ser. No. 741,174, filed on the same date as the application resulting in this patent.

By arranging the mask openings and photodetectors 112 and 114 and their corresponding aligned overlying openings 130 and 132 of the mask 26 in an angled arrangement, preferably at about 45 degrees relative to the radius of rotation of the scale 12 (as shown in FIG. 7), a very satisfactory range of bilateral quadrature phase (i.e., lead/lag) trim is achieved per unit of rotation of the subassembly 10 relative to the scale 12. The lineal dimensions of the lower (radially inward) openings 132 are made slightly longer than the length of the upper (radially outward) openings 13 in order to compensate for the difference in area resulting from the radial divergence of the slightly wedge-shaped radial scale openings 13b. The centrally disposed AGC cell 116 of the array 24 is aligned underneath a corresponding translucent opening 134 of the mask.

ELECTRONIC CIRCUIT 42

Figure 8:
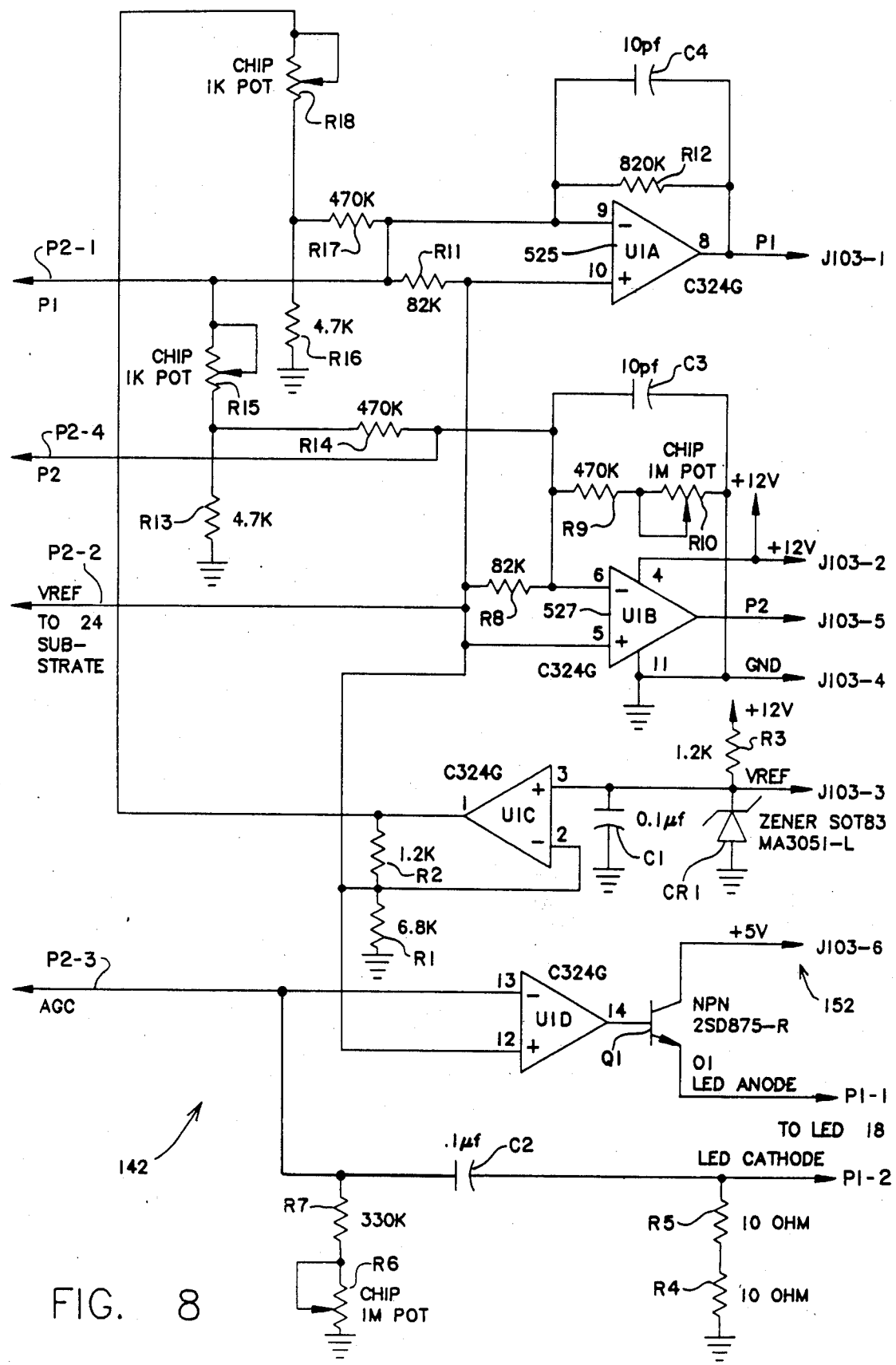
FIG. 8 is an electrical schematic circuit diagram of the electronics of the assembly of FIG. 1.

Turning now to FIGS. 8 and 9, the electronic circuit 42 will be described.

An integrated circuit U1 contains four operational amplifiers U1A, U1B, U1C and U1D. The amplifier U1A is a current to voltage converter and has an inverting input connected to the anode of the upper photocell 112 of the photodetector array 24, and the amplifier U1B is a current to voltage converter having an inverting input connected to the anode of the lower photocell 114 of the array. A negative feedback circuit comprising a capacitor C4 a resistor R12 adjusts the frequency response and gain of the converter U1A, and a similar but adjustable network of capacitor C3 and series resistors R9 and R10 adjusts the frequency response and gain of the converter U1B. The resistor R10 is variable in order to vary the gain of the operational amplifier U1B to compensate for optical energy axis variations resulting from manufacturing tolerances of the LED 18 and for optical sensitivity variations resulting from manufacturing tolerances of the photodetectors 112 and 114.

A reference voltage Vref is derived from a 12 V supply bus from the host equipment through a network comprising a series resistor R3 and 5.0 volt zener diode CR1. The zener regulated 5.0 volts is applied to the non-inverting input of an operational amplifier U1C. A resistance network of resistors R2 and R1 provide at a common node a feedback path to an inverting input of the amplifier U1C and a reference voltage Vref which connects to the common cathode substrate of the photodetector array 24 via a connector J2-2. The values of the resistors R1 and R2 establish the voltage present at the output of the amplifier U1C. This output voltage is supplied to two adjustable networks; the first network comprising the resistors R16, R17 and R18 for controlling the operation of the converter U1A, and the second network comprising the resistors R13, R14 and R15 for controlling the operation of the converter U1B. Resistors R18 and R15 are individually adjustable so that the electrical characteristics of the photocells 112 and 114 respectively may be individually controlled and equalized in terms of voltage output over the range of light to dark. These two adjustments R15 and R18 enable the current output of each photocell 112, 114 (P1 and P2 on FIGS. 8 and 9) to be independently adjusted to a nominal value such as zero, effectively making the networks of resistors R16, R17 and R18, and the network of resistors R13, R14 and R15 two independently adjustable current supply/sink networks which add current to, or subtract current from, the inverting inputs respectively of the amplifiers U1A and U1B, depending upon whether the voltage at the node of R16, R17 and R18 is above or below the Vref voltage at the noninverting input of U1A, and whether the voltage at the node of R13, R14 and R15 is above or below the Vref voltage at the noniverting input of U1B. Thus, the adjustments provided by R15 and R18 enable the user to eliminate current offsets in the photocells of the photodetector array 24 due to the fact that slightly different amounts of light energy typically reach each photocell 112, 114 even when the opaque microlines 13a fully clear the aligned openings 130, 132 of the mask 26.

An automatic gain control (AGC) cell 116 of the array 24 is connected to an inverting input of an operational amplifier U1D via a connector J2-3. The noninverting input of the amplifier U1D is connected to the Vref node. The output of the amplifier U1D is connected to a driver transistor Q1 which in turn supplies current from a 5 volt bus of the host equipment to the anode of the LED light source 18. The cathode of the light source is connected through two current limiting resistors R4 and R5 to ground. A series network of resistors R6 and R7, in combination with the current put out by the AGC photocell 116, controls the current put out by the oporational amplifier U1D and actually applied to the LED through the driver transistor Q1. R6 is adjustable to control quiescent current through the LED 18 in order to maintain the current from the AGC photocell 116 constant in changing operational environments.

One satisfactory physical layout for the elements depicted electrically in FIG. 8 is depicted in the plan view of FIG. 9. Like reference numerals in both figures refer to like elements. The flexible connection extension 46 includes four terminations P2-1, P2-2, P2-3 and P2-4 which are directly soldered to four corresponding connection pads J2-1 (P1 cell 112), J2-2 (substrate of array 24), J2-3 (AGC cell 116), and J2-4 (P2 cell 114) of the photodetector array 24 (see FIG. 7).

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosures and description herein are purely illustrative and are not intended to be in any sense limiting.

We claim:

1. A compact polyphase optical position encoder subassembly for installation in and use with host equipment including a base and a moveable, edge mounted scale with alternating equally dimensioned opaque and translucent regions extending generally perpendicular to a locus of scale movement in a dimension generally parallel to a mounting portion of the base; said subassembly comprising:
   a unitized rotatable housing for aligning a light source, a mask and a photodetector array having at least a pair of photodetector areas symmetrically disposed oppositely about an axis of rotation of said housing and responsive to light energy from said light source as modified by relative position of said scale, said housing including:
   a bolt having a widened head and a threaded shank for passing freely through an opening defined in the mounting portion of the base of said host equipment,
   a threaded nut engageable with said threaded shank opposite to said widened head when said bolt is seated through said opening for for adjusting the height of said bolt relative to said base, and
   compressible bias force providing means compressible between said base and said bolt for enabling a predetermined range of vertical adjustment between said widened head and said base as said nut is rotated about said threaded shank to compress said bias force providing means;
   said housing further including a cell holder mounted to said widened head for holding said photodetector array and said mask in predetermined proper optical alignment about said axis of rotation,
   said housing further including a light source holder mounted to said cell holder for holding said light source a predetermined distance away from said cell holder in proper optical alignment, said cell holder and said light source holder defining a transverse opening enabling said scale to pass freely along its locus of movement adjacent to said mask,
   whereby rotation of said housing facilitates phase lead-lag trim between the poly phases put out by said photodetector array and compression of said bias force providing means controls gap spacing between said scale and said mask.

2. The compact subassembly as set forth in claim 1 wherein said light source holder comprises a central support, a reflective surface in optical alignment with said photodetector array and being aligned and supported by said central support, and a lateral arm spaced away from said central support, said lateral arm for holding a said light source in optical alignment with said reflective surface, whereby said subassembly may be made very compact in terms of height and still provide a substantial distance between the light source and the mask, thereby minimizing penumbra effects.

3. The compact subassembly as set forth in claim 1 wherein said compressible bias force providing means comprises a wave spring washer.

4. A compact polyphase optical encoder subassembly for installation and use with host equipment including a base and a moveable, edge mounted scale with alternating equally dimensioned opaque and translucent regions extending generally perpendicular to a locus of scale movement in a dimension generally parallel to a mounting portion of the base; said subassembly comprising:
   a unitized rotatable and height adjustable housing for aligning and supporting a light source, a mask and a photodetector array having at least a pair of photodetector areas symmetrically disposed about an axis of rotation of said housing and responsive to light energy from said light source in further response to relative position of said scale, said housing being rotatably alignable and height adjustable with respect to said mounting portion and including:
   a cell holder mounted to said housing for holding said photodetector array and said mask in a predetermined proper alignment,
   said housing further including a light source holder mounted to said cell holder for holding said light source a predetermined distance away from said cell holder, said cell holder and said light source holder defining a transverse opening enabling said scale to pass freely along its locus of movement adjacent to said mask, said light source holder comprising a central support, a reflective surface in optical alignment with said photodetector array and being aligned and supported by said central support, and a lateral arm spaced away from said central support, said lateral arm for holding said light source in optical alignment with said reflective surface and said photodetector array, whereby said subassembly may be made very compact in terms of height and still provide a substantial distance between the light source and the mask, thereby minimizing penumbra effects.

5. The compact polyphase optical encoder subassembly as set forth in claim 4 wherein said housing includes a bolt having a widened head and a threaded shank for passing freely through an opening defined by said mounting surface in said base of said host equipment, a threaded nut engageable with said threaded shank opposite to said widened head for adjusting the height of said bolt relative to said base, and compressible washer means for enabling a predetermined range of vertical compression between said widened head and said base as said nut is tightened on said shaft, whereby rotation of said housing facilitates phase lead-lag trim of said subassembly and compression of said washer means controls spacing between said scale and said mask.

* * * * *